US012755469B2

(12) United States Patent
Shen

(10) Patent No.: US 12,755,469 B2
(45) Date of Patent: Oct. 6, 2026

(54) METHOD AND APPARATUS FOR RENDERING PARTICLE EFFECT, DEVICE AND MEDIUM

(71) Applicant: Beijing Zitiao Network Technology Co., Ltd., Beijing (CN)

(72) Inventor: Huaiye Shen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 110 days.

(21) Appl. No.: 18/723,366

(22) PCT Filed: Dec. 22, 2022

(86) PCT No.: PCT/CN2022/140877
§ 371 (c)(1),
(2) Date: Jun. 21, 2024

(87) PCT Pub. No.: WO2023/116801
PCT Pub. Date: Jun. 29, 2023

(65) Prior Publication Data

US 2025/0157124 A1 May 15, 2025

(30) Foreign Application Priority Data

Dec. 24, 2021 (CN) ........................ 202111602150.6

(51) Int. Cl.
*G06T 15/00* (2011.01)

(52) U.S. Cl.
CPC .................................. *G06T 15/00* (2013.01)

(58) Field of Classification Search
CPC ..................................................... G06T 15/00
See application file for complete search history.

(56) References Cited

U.S. PATENT DOCUMENTS

2011/0055815 A1 3/2011 Squillace
2016/0093092 A1 3/2016 Fay et al.
2024/0037830 A1 * 2/2024 Guo ........................ G06T 19/20

FOREIGN PATENT DOCUMENTS

CN 102426691 A 4/2012
CN 106204696 A 12/2016
CN 111145329 A 5/2020
CN 111968210 A 11/2020
CN 112529997 A 3/2021
CN 112652044 A 4/2021
CN 112700517 A * 4/2021 ............ G06T 13/60
CN 112700518 A 4/2021
CN 114332323 A 4/2022

OTHER PUBLICATIONS

International Patent Application No. PCT/CN2022/140877; Int'l Search Report; dated Mar. 1, 2023; 3 pages.

* cited by examiner

*Primary Examiner* — Yassin Alata
(74) *Attorney, Agent, or Firm* — BakerHostetler

(57) ABSTRACT

Embodiments of the present disclosure disclose a method and an apparatus for rendering a particle effect, a device, and a medium. The method includes: obtaining a particle morphology model, where the particle morphology model includes vertex sub-models constituting an overall model; determining a running trajectory of a vertex sub-model based on a particle reorganization rule; and rendering the vertex sub-model during a running process in real time by controlling the vertex sub-model to run based on a corresponding running trajectory.

20 Claims, 2 Drawing Sheets

METHOD AND APPARATUS FOR RENDERING PARTICLE EFFECT, DEVICE AND MEDIUM

CROSS-REFERENCE TO RELATED APPLICATIONS

The present application is a national stage application filed under 35 U.S.C. 371 based on International Patent Application No. PCT/CN2022/140877, filed Dec. 22, 2022, which claims the priority to Chinese Patent Application No. 202111602150.6, filed with the Chinese Patent Office on Dec. 24, 2021, the disclosures of which are incorporated in their entireties herein by reference.

FIELD

Embodiments of the present disclosure relate to a technical field of effects rendering, and for example, to a method and an apparatus for rendering a particle effect, a device, and a medium.

BACKGROUND

The demand for displaying an object keeps increasing as video and short video technology continuously develops. At present, effects can be added while displaying the object, so as to improve the diversity of object display.

However, the current processing manner for effects faces an issue of insufficient variety to meet user needs.

SUMMARY

Embodiments of the present disclosure provide a method and an apparatus for rendering a particle effect, a device, and a medium, achieving a running effect in simulation of the particle effect.

In a first aspect, embodiments of the present disclosure provide a method for rendering a particle effect. The method includes: obtaining a particle morphology model, where the particle morphology model includes vertex sub-models constituting an overall model; determining running trajectories of the vertex sub-models based on a particle reorganization rule; and controlling the vertex sub-models to run based on the corresponding running trajectories, and rendering the vertex sub-models during running in real time.

In a second aspect, embodiments of the present disclosure further provide an apparatus for rendering a particle effect. The apparatus includes: a model obtaining module, configured to obtain a particle morphology model, where the particle morphology model includes vertex sub-models constituting an overall model; a running trajectory determination module, configured to determine running trajectories of the vertex sub-models based on a particle reorganization rule; and a rendering module, configured to control the vertex sub-models to run based on the corresponding running trajectories and render the vertex sub-models during running in real time.

In a third aspect, embodiments of the present disclosure further provide an electronic device. The electronic device includes: one or more processors; and a memory, configured to store one or more programs, where the one or more processors implement the method for rendering a particle effect of any one of the examples of the disclosure when the one or more programs are executed by the one or more processors.

In a fourth aspect, embodiments of the present disclosure further provide a storage medium including a computer-executable instruction. The computer-executable instruction, when executed by a computer processor, is configured to perform the method for rendering a particle effect of any one of the embodiments of the present disclosure.

BRIEF DESCRIPTION OF THE DRAWINGS

Throughout the drawings, the same or similar reference numerals represent the same or similar elements. It should be understood that the accompanying drawings are schematic, and components and elements are not necessarily drawn to the actual scale.

DETAILED DESCRIPTION OF EMBODIMENTS

It should be understood that multiple steps described in the method embodiment of the disclosure can be executed in different orders and/or in parallel. Furthermore, the method embodiment can include additional steps and/or steps omitted for execution. The scope of the disclosure is not limited in this regard.

The terms “comprise” and “include” and variations thereof used herein are open-ended, i.e. “comprise, but not limited to” and “include, but not limited to”. The term “based on” means “at least partially based on”. The term “an example” means “at least one example”; the term “another example” means “at least one other example”; and the term “some examples” means “at least some examples”. Related definitions of other terms will be provided in the following description.

It should be noted that the concepts such as “first” and “second” mentioned in the disclosure are merely intended to distinguish different apparatuses, modules or units, and are not intended to define the order or interdependence of the functions executed by these apparatuses, modules or units.

It should be noted that the terms of “a/an” or “a plurality of” mentioned in the disclosure is illustrative rather than limiting, and those skilled in the art should understand that the terms should refer to “one or more” unless explicitly stated otherwise in the context.

Figure 1:
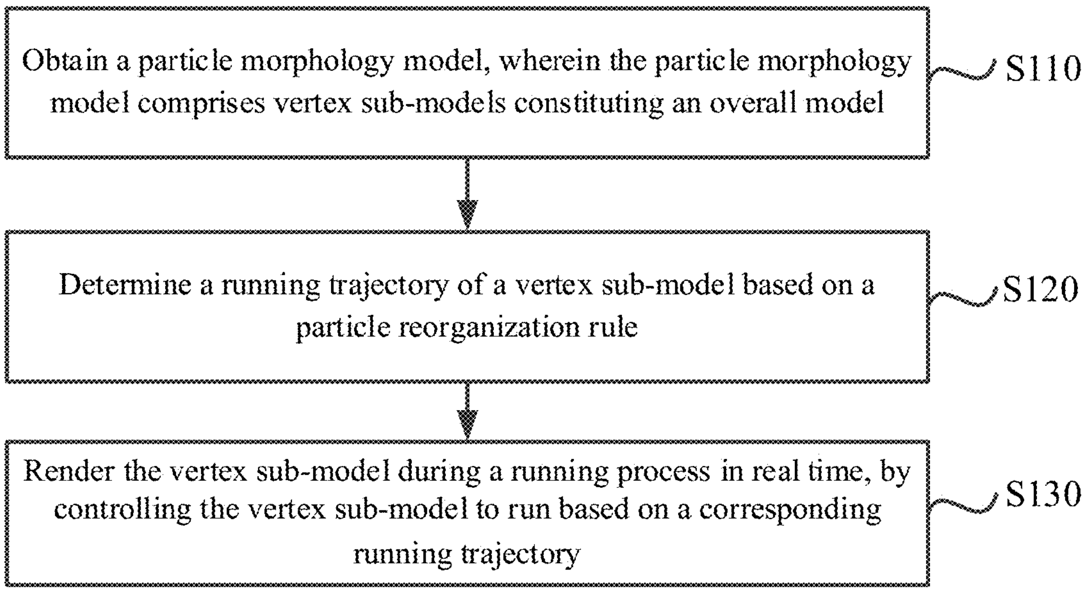
FIG. 1 is a schematic flow chart of a method for rendering a particle effect according to embodiments of the present disclosure.

FIG. 1 is a schematic flow chart of a method for rendering a particle effect according to embodiments of the present disclosure. The embodiments of the present disclosure are suitable for simulation of a reorganization process of the particle effect during a model reorganization process. The method may be executed by an apparatus for rendering a particle effect. The apparatus for rendering a particle effect may be implemented in software and/or hardware. For example, the apparatus for rendering a particle effect is implemented by means of an electronic device. The electronic device may be a mobile terminal or a personal computer (PC) terminal. As shown in FIG. 1, the method of the embodiments includes:

S110, a particle morphology model is obtained, where the particle morphology model includes vertex sub-models constituting an overall model.

S120, a running trajectory of a vertex sub-model is determined based on a particle reorganization rule.

S130, the vertex sub-model is rendered in real time during a running process by controlling the vertex sub-model to run based on the corresponding running trajectory.

In embodiments, the model may be a model configured to perform displaying and simulate a reorganization process. The model may include, but not limited to, any type of model such as a mask model, an accessory model, a clothing model, an architectural model, a vehicle model, etc., and the type and structure of the model are not limited herein. The model may be a three-dimensional structure model.

A particle is the smallest component of matter that may exist in a free state. Any model includes a large number of particles. In order to simulate particle effects, the overall model is transformed into the particle morphology model. The particle morphology model includes all vertex sub-models constituting the overall model. Each vertex sub-model is configured to simulate one particle.

In some embodiments, particle morphology models corresponding to a plurality of overall models are pre-stored, and a corresponding particle morphology model is invoked according to a selection on the model. Exemplarily, the overall model and the particle morphology model, which are stored in a model library, are stored associated with each other by a model identifier. The particle morphology model may be obtained by simulating particle division on the overall model in advance. For example, a grid division may be performed on f the overall model. A size of a unit grid may be preset, or may be determined according to a size of the overall model and target vertex data. A particle division is simulated on the overall model based on the preset grids. The overall model is divided into sub-models (i.e. vertex sub-models) corresponding to a plurality of vertices based on the grids. Identifiers are set for the plurality of vertex sub-models in the particle morphology model. For example, the identifiers may be serial number identifiers. For example, identifiers may be center coordinates of the vertex sub-models in the overall model according to positions of the plurality of vertex sub-models in the overall model. The identifiers of the plurality of vertex sub-models and corresponding position information are stored associatively.

In some embodiments, the step of obtaining a particle morphology model includes: invoking the particle morphology model of a model in response to a selection operation on the model. For example, an interactive interface of an electronic device includes a selection area of model identifier, which display model identifiers of a plurality of model. The model identifier may be a two-dimensional icon of the model, or descriptive text. Exemplarily, the model to be rendered is a head model, and correspondingly, the model identifier may include, but not limited to, an identifier in the form of descriptive text such as "fox head" and "hammer head". Upon detecting a selection operation on any model identifier, it is triggered that a rendering instruction including the model identifier is generated in response to a rendering instruction, that is, in response to the selection operation on the model. For example, the selection operation by a user on the model is identified by detecting a specific behavior of the user. Exemplarily, an image of the user is collected in real time by means of a camera and displayed in an interactive page in real time to identify whether the user image includes the specific behavior. If yes, it is determined that the selection operation on the model is detected. For example, corresponding relations between different models and different behaviors are pre-stored. Exemplarily, a behavior corresponding to a first model may be nodding, and a behavior corresponding to a second model may be shaking. For example, a selection order of a plurality of models is pre-stored, and the specific behavior may be used to switch models. For example, a first behavior is used to switch to a previous model, and a second behavior is used to switch to a next model. After the selection operation by the user on the model is determined by detecting the user behavior, it is triggered that the rendering instruction including the model identifier is generated.

In some embodiments, there may be a plurality of rendering modes for models, and a rendering mode of simulating particles according to the present embodiment is one of the plurality of rendering modes. Exemplarily, the rendering mode includes, but not limited to, point rendering, module rendering, overall rendering, etc. The point rendering mode is used to render a particle morphology model in units of vertex sub-models, the module rendering mode may be used to render the model in units of modules, and the overall rendering mode is used is used to render the model in units of an overall model. Prior to invoking the particle morphology model, the following is further included: determining whether a current rendering mode is point rendering, and continuing invoking the particle morphology model based on a determination that the current rendering mode is point rendering. An interactive page includes a selection control of a rendering mode, which is used to input information about the rendering mode or to switch rendering mode, which is not limited.

For each vertex sub-model in the particle morphology model, a running trajectory of the vertex sub-model is determined based on a particle reorganization rule. The running trajectory is used to control the vertex sub-model to run to an original position of the vertex sub-model in the particle morphology model. Correspondingly, the plurality of vertex sub-models run to original positions of the vertex sub-models in the particle morphology model respectively, in this way, the models are recombined.

For example, the step of determining a running trajectory of a vertex sub-model based on a particle reorganization rule includes: determining running positions of the vertex sub-model at a plurality of time points based on the particle reorganization rule, and forming the running trajectory based on the running positions at the plurality of time points. In the present embodiments, for each vertex sub-model in the particle morphology model, a running position of the vertex sub-model at each time point during the running process is determined, and the plurality of running positions are connected to form the running trajectory. In some embodiments, the running trajectories for the plurality of vertex sub-models are smoothed to improve smoothness and cohesion of running.

In some embodiments, the particle reorganization rule includes a target position, a running direction and a running duration of the vertex sub-model. The vertex sub-model herein is all vertex sub-models to be rendered in the particle morphology model. The vertex sub-model runs in the running direction, and a unit running distance of the vertex sub-model may be fixed. That is, the vertex sub-model is located at the farthest distance from the target position in the running direction at an initial time point, and is located at the target position at an end time point. Correspondingly, the running position of the vertex sub-model at each time point may be determined inversely.

In the embodiment, the running duration of the vertex sub-model may be preset, or may be selected and set by the user. The running durations of different vertex sub-models may be the same or different, and an input control or a selection control for the running duration may be set on the interactive interface, so as to collect the running duration input by the user. Different running durations may control a running range of the plurality of vertex sub-models. By setting an interactive control, an interaction with the user is achieved, and interactivity of a model simulation process is improved.

In some embodiments, a unit running distance of a vertex sub-model may be set according to user requirements. Correspondingly, an input control or a selection control of the unit running distance may be set on the interactive interface, so as to collect the unit running distance input by the user, generate a corresponding simulation effect according to user requirements, and improve variability and flexibility of the simulation effect.

For example, the particle reorganization rule may include the following formula: V1=V0+(N−T)*Normal. V1 may be the running position corresponding to the time point T, V0 may be the target position of the vertex sub-model, N is the running duration of the vertex sub-model, and Normal is the running direction of the vertex sub-model. The target position of the vertex sub-model in the above formula is position information of the vertex sub-model in the particle morphology model. In the embodiment, the particle morphology model is recombined in a form of particle simulation to determine a rendering range of the particle morphology model, which may be, for example, a rendering range in the interactive interface. The rendering range of the particle morphology model is a range in which a head of a target object is located in the interactive interface by taking the model as a head model as an example. Coordinate information of the particle morphology model is converted into a coordinate system in which the interactive interface is located, and coordinate information of the plurality of vertex sub-models, i.e. target positions of the vertex sub-models, is determined in the coordinate system in which the interactive interface is located.

In the above formula, Normal may be a unit vector in the running direction, and represents the unit running distance in the running direction. In some embodiments, the particle reorganization rule may further include a unit matrix representing a unit running distance, which is not limited.

For example, the running direction of the vertex sub-model is the normal direction of the vertex sub-model. That is, Normal in the above formula may be the normal direction of the vertex sub-model. According to the running position of the vertex sub-model in the normal direction of the vertex sub-model, the running trajectory of the vertex sub-model from far to near in the normal direction is determined. Correspondingly, the plurality of vertex sub-models are controlled to run from far to near along the determined running trajectory until the plurality of vertex sub-models run to the target positions in the particle morphology model. At an initial time point of running of the plurality of vertex sub-models, each vertex sub-model is rendered in real time according to the running position of each vertex sub-model. Thus, a reorganization process of rendering the model in the form of points is achieved, and a rendering effect of simulating particle reorganization of the model is achieved.

For example, the running direction of the vertex sub-model is determined based on the normal direction of the vertex sub-model and a rotation matrix. That is, the normal direction of each vertex sub-model is rotated to control a reorganization of the plurality of vertex sub-models based on rotated running trajectories, improving a variability and diversity of running of the vertex sub-models. Correspondingly, the running trajectory of the vertex sub-model in a rotation direction of the vertex sub-model is determined based on the running position of the vertex sub-model in the rotation direction. The plurality of vertex sub-models are controlled to run in the determined running trajectories until the plurality of vertex sub-models all run to target positions in the particle morphology model.

For example, running rotating modes for different vertex sub-models may be the same. That is, different vertex sub-models correspond to a same rotation matrix. For example, the running rotating modes for different vertex sub-models may be different, and a plurality of rotation matrixes may be set. For example, the vertex sub-models in the particle morphology model may be divided into a plurality of zones, and different zones invoke different rotation matrixes. Optionally, the rotation matrixes invoked by the plurality of vertex sub-models may be randomly determined, so as to disturb running uniformity of the plurality of vertex sub-models and improve running variability. The rotation matrix may include, but not limited to, a first rotation matrix rotating around any one axis of XYZ, a second rotation matrix rotating around any two axes of XYZ, and a third rotation matrix rotating around three axes of XYZ.

In the above embodiments, a rotation angle of the rotation matrix may be determined based on a running time parameter, so as to ensure that the rotation matrix may run to the target position at the end time point of running while rotating. For example, the rotation angle may be reduced over the running time. Exemplarily, a rotation direction may be Normal1=(10−T)*Rot*Normal. Normal1 is the rotation running direction, Normal is the normal direction of the vertex sub-model, and Rot is the rotation matrix. Correspondingly, the running position of the vertex sub-model at each time point may be V1=V0+(10−T)*Normal0=V0+(10−T)*(10−T)*Rot*Normal.

On the basis of the above embodiments, the particle reorganization rule further includes a random running parameter of the plurality of vertex sub-models. The random running parameter may be determined according to the target position of the vertex sub-model. For example, a preset random number generation function is invoked, and the target position is input into the random number generation function to obtain the random running parameter of the vertex sub-model. The random running parameter may be within a preset parameter range. By setting the random running parameter, running uniformity of the vertex sub-model can be reduced, and variability of the running trajectory can be improved. For example, the running position of the vertex sub-model at each time point may be V1=V0+(10−T)*Normal0=V0+(10−T)*(10−T)*Rot*Normal*P(V0), where P(V0) is the random running parameter generated based on the target position.

On the basis of the above embodiments, the reorganization process of the model may include a particle contraction reorganization process, or may include a particle diffusion process and a particle contraction reorganization process. Correspondingly, the particle reorganization rule includes a contraction sub-rule according to the above embodiments, or may include a diffusion sub-rule and a contraction sub-rule. The diffusion sub-rule is used to determine the running trajectories of the plurality of vertex sub-models in the particle morphology model in a diffusing process from an initial position to the outside. The diffusion sub-rule includes the initial position, a running direction, and a running duration of the vertex sub-model. The initial position of the vertex sub-model is position information of the vertex sub-model in the particle morphology model. Correspondingly, the diffusion sub-rule may include the following formula: V1=V2+D*Normal0. V2 is the initial position of the vertex sub-model in the diffusion process, D is an offset parameter, e.g. the running time T, and Normal0 is the running direction. In some embodiments, a running direction in a diffusion sub-rule may be a normal direction of the vertex sub-model, and alternatively, a rotation direction may be determined based on a normal direction of the vertex sub-model and a rotation matrix. In some embodiments, the diffusion sub-rule further includes a random running parameter of the vertex sub-model, to improve a trajectory diversity of the vertex sub-model during the diffusion process.

In some embodiments, running duration of a diffusion process and running duration of a contraction process of the model may be the same. A diffusion running trajectory of the vertex sub-model is generated based on the diffusion sub-rule, and a contraction running trajectory of the vertex sub-model is generated based on the contraction sub-rule. A tail of the diffusion running trajectory is connected to a head of the contraction running trajectory to obtain the contraction running trajectory, and the vertex sub-model for rendering is controlled to run based on the contraction running trajectory, to achieve the diffusion and reorganization process having a particle effect on model simulation.

On the basis of the above embodiments, in order to simulate the effect that particles are gradually increased to recombine the model, the effect of the process of simulation from fewer particles to more particles can be achieved by setting initial rendering time of the vertex sub-model at different positions. For example, the initial rendering time of the vertex sub-model is sequentially and gradually increased in a preset rendering direction. The rendering direction can be from bottom to top or from top to bottom, which is not limited.

In some embodiments, the step of rendering the vertex sub-model during a running process in real time includes: determining a plurality of transparencies at a plurality of time points during a rendering process according to position information of the vertex sub-model; and rendering the vertex sub-models based on a transparency and a running position of the vertex sub-model at each of the plurality of time points.

Position information of the vertex sub-model is position information of the vertex sub-model in the particle morphology model. The transparency of each vertex sub-model may be changed between 0% and 100%. The vertex sub-models having a transparency of 100% may not be displayed in the interactive interface, which is equivalent to not rendering. During the rendering process, different vertex sub-models use different transparencies to simulate a process of appearance and increase of the vertex sub-models.

For example, initial transparencies of different vertex sub-models may be different. For example, the initial transparencies of the vertex sub-models may be different values between 0% and 100%. Exemplarily, the initial transparency of the local vertex sub-model may be 1, the initial transparency of the local vertex sub-model may be 0, or the initial transparency of the local vertex sub-model may be 0.5. For example, the vertex sub-models having initial transparency of 1 may be distributed at initial positions in the rendering direction.

In some embodiments, initial transparencies of the vertex sub-models are sequentially increased in a rendering direction, so as to simulate earliest appearance of particles at an initial position in the rendering direction. The transparencies of the plurality of vertex sub-models are gradually reduced during the rendering process until the transparency is a first transparency, so as to simulate sequential appearance of new particles in the rendering direction. The first transparency may be a value less than 1 and greater than or equal to 0. For example, a third transparency may be zero. In the present embodiment, the rendering direction may include, but not limited to, from bottom to top, from top to bottom, from left to right, from right to left, from center to periphery, and from periphery to center.

According to the technical solution of the embodiments, the plurality of vertex sub-models in the particle morphology model are obtained, particles constituting the model are simulated by means of the vertex sub-models, the running trajectories of the plurality of vertex sub-models are determined based on the particle reorganization rule, the plurality of vertex sub-models are controlled to run based on the corresponding running trajectories, and the plurality of vertex sub-models during a running process are rendered in real time. Thus, the running process of the reorganization model of the particles is simulated, and the running process is rendered to simulate the particle dynamic reorganization process of the model.

On the basis of the above embodiments, running of the plurality of vertex sub-models is controlled, such that the vertex sub-models for rendering are controlled to run to the target positions in the particle morphology model based on the running trajectories, and the particle morphology model is formed. However, there is a difference between the particle morphology model and the overall model. That is, the particle morphology model is drawn based on the vertex sub-models, rather than a complete model. In view of the above situation, the method according to the embodiments further includes: synchronously rendering the overall model in a process of rendering the plurality of vertex sub-models in real time, and setting the vertex sub-models to be in a fully transparent state at an end time point of rendering, where rendering duration of the particle morphology model is the same as rendering duration of the overall model. By rendering the vertex sub-model in a running process, the particle reorganization process is simulated. By rendering the overall model, the overall model is displayed at the end time point of rendering. By setting the vertex sub-models to be in the fully transparent state at the end time point of rendering, interference of the particle morphology model to display of the overall model is avoided at the end time point.

In some embodiments, the overall model may be rendered by controlling the transparency of the overall model, and the transparency of the overall model is uniformly adjusted from 100% to 0 according to the rendering duration of the overall model, so as to render the overall model. That is, the transparency of pixels in the overall model is 100% at the initial time point and is 0 at the end time point.

In some embodiments, the step of rendering the overall model includes: sequentially adjusting, according to a rendering direction, transparencies of data points on a plurality of position lines of the overall model in the rendering direction, where an initial transparency of the overall model is a second transparency, and the plurality of position lines are perpendicular to the rendering direction. The second transparency may be a value greater than 0 and less than or equal to 1. Exemplarily, the second transparency may be 1. In the present embodiment, the rendering directions of the particle morphology model and the overall model are the same, so as to synchronously render the particle morphology model and the overall model. For the overall model, model data in the rendering direction are sequentially rendered in the rendering direction to simulate the appearance process of the overall model in the rendering direction. For example, the rendering direction is from bottom to top, and then the position line is a vertical line in the rendering direction. For example, the rendering direction is a longitudinal rendering direction from bottom to top, and then the position line may be a plurality of pixel rows on the overall model. For example, the rendering direction is a horizontal rendering direction, and then the position line may be a plurality of pixel columns on the overall model. For example, the rendering direction is a circular rendering direction from center to periphery, and then the position line may be a circular line perpendicular to the rendering direction.

Correspondingly, the transparencies of the data points on the plurality of position lines of the overall model in the rendering direction are sequentially adjusted according to the rendering direction. The transparencies of the data points on each position line may be sequentially reduced, so as to simulate the process of growing the data points on the plurality of position lines from nothing.

For example, the step of adjusting transparencies of data points on a plurality of position lines of the overall model in a rendering direction includes: adjusting the transparencies of the data points on a triggered position line to a third transparency. The third transparency may be a value less than 1 and greater than or equal to 0, and the third transparency may be 0. Exemplarily, the transparency of a data point on the triggered position line is adjusted from 1 to 0. The triggered position line appears sequentially in the rendering direction to simulate the appearance process of the data points on the position line.

For example, the step of sequentially adjusting transparencies of data points on a plurality of position lines of the overall model in the rendering direction includes: reducing the transparencies of the data points on the triggered position line to a third transparency gradually, so as to simulate gradual appearance of the data points on the position line. In the present embodiment, the change efficiency of the transparencies of the plurality of data points may further be limited to control a change of transparencies for the plurality of data points.

According to the technical solution according to the embodiments, synchronous rendering of the particle morphology model and the overall model is controlled, such that defects of the vertex sub-models in the particle morphology model during the rendering process are compensated, achieving the rendering of the particle effect in the model reorganization process.

On the basis of the above embodiment, an example is further provided in embodiments of the present disclosure. The method includes: in response to a selection operation on the model identifier, invoking a particle morphology model and an overall model corresponding to model identifier. For example, by matching the model identifiers in a model library the particle morphology model and the overall model stored associatively (the particle morphology model includes vertex sub-models constituting an overall model) and position information of the plurality of vertex sub-models are determined.

In response to a setting operation on a rendering parameter, the rendering parameter of the model is obtained, where the rendering parameter includes at least one of: a rendering duration or a rotation type. The rotation type is used to adjust a rotation matrix in a particle reorganization rule, and may include rotation around a single axis, rotation around two axes, and rotation around three axes. A rotation axis may be any one of XYZ coordinate axes in a coordinate system. The rendering parameter is used to adjust a particle reorganization rule invoked subsequently.

The particle reorganization rule corresponding to an effect type is invoked in response to a selection operation on the effect type, where the particle reorganization rule includes at least one of a diffusion sub-rule or a contraction sub-rule. The effect type includes contraction reorganization and diffusion before contraction reorganization, where a contraction sub-rule is invoked by the effect type of contraction reorganization, and a diffusion sub-rule and a contraction sub-rule are invoked by the effect type of diffusion before contraction reorganization. According to the obtained rendering parameter, the invoked particle reorganization rule is updated, to obtain a particle reorganization rule suitable for a current reorganization process. Exemplarily, a model to be rendered is a head model, an image of an interactive object is obtained, the image includes a portrait, the image is displayed in an interactive interface, a position of the portrait in the interactive interface is identified, and a rendering range of the model is determined, where the rendering range may be a range of a portrait head in the image. Target positions of the plurality of vertex sub-models in the rendering range are determined based on the rendering range and coordinate conversion relations of the plurality of vertex sub-models in the particle morphology model. The particle reorganization rule is updated by using the target positions as parameters, so as to determine running trajectories of the plurality of vertex sub-models based on the particle reorganization rule in a current reorganization process.

The particle morphology model and the overall model are rendered synchronously, where the particle morphology model and the overall model are rendered based on the same rendering direction. For example, the plurality of vertex sub-models are controlled to run based on the corresponding running trajectories, the plurality of vertex sub-models are rendered in real time during a running process, and the overall model is rendered at the same time. The particle morphology model and the overall model are synchronously rendered in the rendering direction, by controlling transparencies of a plurality of data points in the overall model and transparencies of the plurality of vertex sub-models in the particle morphology model. The transparencies of the plurality of vertex sub-models in the particle morphology model is controlled to be switched to 100% at an end time point of rendering, so as to complete a particle reorganization simulation process of the model.

Figure 2:
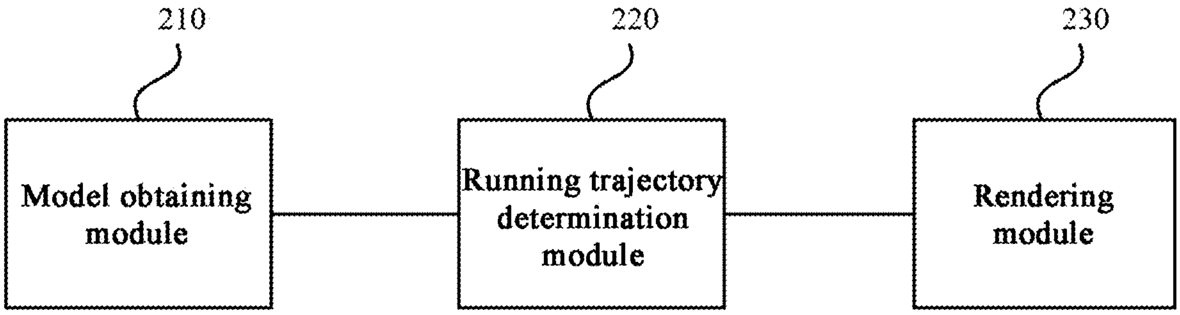
FIG. 2 is a schematic structural diagram of an apparatus for rendering a particle effect according to embodiments of the present disclosure.

FIG. 2 is a schematic structural diagram of an apparatus for rendering a particle effect according to embodiments of the present disclosure. As shown in FIG. 2, the apparatus includes: a model obtaining module 210, configured to obtain a particle morphology model, where the particle morphology model includes vertex sub-models constituting an overall model; a running trajectory determination module 220, configured to determine a running trajectory of a vertex sub-model based on a particle reorganization rule; and a rendering module 230, configured to render the vertex sub-model during a running process in real time by controlling the vertex sub-model to run based on a corresponding running trajectory.

On the basis of the above embodiment, the running trajectory determination module 220 is configured to: determine running positions of the vertex sub-model at a plurality of time points based on the particle reorganization rule, and form the running trajectory based on the running positions at the plurality of time points.

For example, the particle reorganization rule includes a target position, a running direction, and a running duration of the vertex sub-model.

For example, the running direction of the vertex sub-model is a normal direction of the vertex sub-model, and alternatively, the running direction of the vertex sub-model is determined based on a normal direction of the vertex sub-model and a rotation matrix.

For example, the particle reorganization rule further includes a random running parameter of the vertex sub-model.

On the basis of the above embodiment, the rendering module 230 includes: a transparency setting unit, configured to determine a transparency at each of a plurality of time points during a rendering process according to position information of the vertex sub-model; and a first rendering unit, configured to render the vertex sub-model based on the transparency and a running position of the vertex sub-model at each of the plurality of time points.

For example, an initial transparency of the vertex sub-model is sequentially increased in a rendering direction; and the transparency of the vertex sub-model is gradually reduced during the rendering process until the transparency of the vertex sub-model is a first transparency.

The rendering module 230 further includes: a second rendering unit, configured to synchronously render the overall model in a process of rendering a plurality of vertex sub-models in real time, and set the vertex sub-models to be in a fully transparent state at an end time point of rendering, where a rendering duration for the particle morphology model is the same as a rendering duration for the overall model.

For example, the second rendering unit is configured to: sequentially adjust, according to a rendering direction, transparencies of data points on a plurality of position lines of the overall model in the rendering direction, where an initial transparency of the overall model is a second transparency, and the plurality of position lines are perpendicular to the rendering direction.

For example, the second rendering unit is configured to: adjust the transparency of a data point on a triggered position line to a third transparency; and alternatively, gradually reduce the transparency of the data point on the triggered position line until the transparency of the data point on the triggered position line is a third transparency.

On the basis of the above embodiment, the model obtaining module 210 is configured to: invoke a model, and divide the model based on grids of the model to obtain the plurality of vertex sub-models, where the vertex sub-models form the particle morphology model.

On the basis of the above embodiment, the model obtaining module 210 is configured to: invoke the particle morphology model of a model in response to a selection operation on the model.

On the basis of the above embodiment, the apparatus further includes: a parameter setting operation response module, configured to obtain a rendering parameter of a model in response to a setting operation on the rendering parameter, where the rendering parameter include at least one of a rendering duration or a rotation type.

On the basis of the above embodiment, the apparatus further includes: an effect type operation response module, configured to invoke the particle reorganization rule corresponding to an effect type in response to a selection operation on the effect type, where the particle reorganization rule includes at least one of a diffusion sub-rule or a contraction sub-rule.

The apparatus according to embodiment of the present disclosure may execute the method according to any embodiment of the present disclosure, and has corresponding functional modules and beneficial effects upon execution of the method.

It is worth noting that a plurality of units and modules included in the apparatus above are merely divided according to a functional logic, but are not limited to the above division, as long as the corresponding functions can be achieved. In addition, particular names of the plurality of functional units are merely for the convenience of mutual distinguishing and are not used to limit the scope of protection of the examples of the disclosure.

Figure 3:
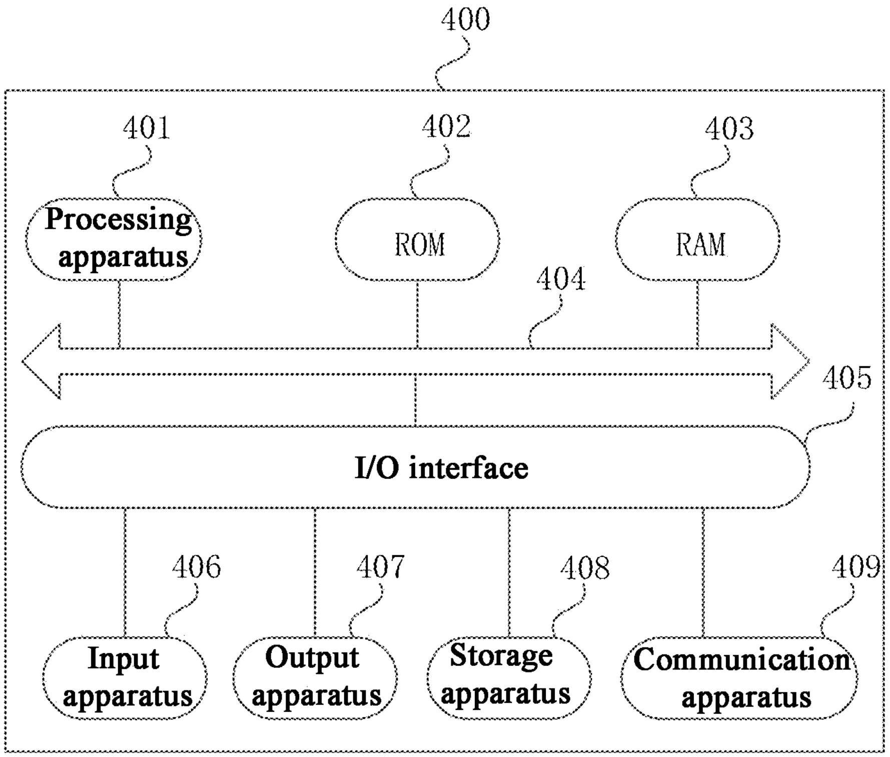
FIG. 3 is a schematic structural diagram of an electronic device according to embodiments of the present disclosure.

Reference is made to FIG. 3 below, which shows a schematic structural diagram of an electronic device (such as a terminal device or server in FIG. 3) 400 suitable for implementing embodiments of the present disclosure. The terminal device in embodiments of the present disclosure may include, but not limited to, a mobile terminal such as a mobile phone, a notebook computer, a digital broadcast receiver, a personal digital assistant (PDA), a portable android device (PAD), a portable multimedia player (PMP), a vehicle-mounted terminal (for example, a vehicle-mounted navigation terminal), or the like, and a fixed terminal such as a digital television (TV), a desktop computer, or the like. The electronic device shown in FIG. 3 is merely an example and should not bring any limitation to functions and the scope of use of the example of the disclosure.

As shown in FIG. 3, the electronic device 400 may include a processing apparatus (such as a central processing unit and a graphics processing unit) 401 that may execute various suitable actions and processes according to a program stored in a read only memory (ROM) 402 or a program loaded from a storage apparatus 408 into a random access memory (RAM) 403. Various programs and data necessary for the operation of the electronic device 400 are also stored in the RAM 403. The processing apparatus 401, the ROM 402, and the RAM 403 are connected to each other through a bus 404. An input/output (I/O) interface 405 is also connected to the bus 404.

Generally, the following apparatuses may be connected to the I/O interface 405: an input apparatus 406 including, e.g., a touch screen, a touch pad, a keyboard, a mouse, a camera, a microphone, an accelerometer, and a gyroscope; an output apparatus 407 including, e.g., a liquid crystal display (LCD), a speaker, and a vibrator; the storage apparatus 408 including, e.g., a magnetic tape and a hard drive; and a communication apparatus 409. The communication apparatus 409 may allow the electronic device 400 to perform wireless or wired communication with other devices to exchange data. Although FIG. 3 illustrates the electronic device 400 having various apparatuses, it should be understood that not all of the illustrated apparatuses are required to be implemented or provided. More or less apparatuses may be alternatively implemented or provided.

According to embodiments of the present disclosure, the process described above with reference to the flow chart may be implemented as a computer software program. For example, embodiments of the present disclosure include a computer program product including a computer program carried on a non-transitory computer-readable medium. The computer program includes program codes configured to execute the method shown in the flow chart. In such an embodiment, the computer program may be downloaded and installed from a network via the communication apparatus 409, or installed from the storage apparatus 408, or installed from the ROM 402. When the computer program is executed by the processing apparatus 401, the functions described above defined in the method of the example of the disclosure are executed.

The electronic device according to embodiments of the present disclosure belongs to the same concept as the method for rendering a particle effect according to the above embodiments, technical details not described in detail in the embodiments can refer to the above embodiments, and the embodiments has the same beneficial effects as the above embodiments.

A computer storage medium is provided in embodiments of the present disclosure. The computer storage medium stores a computer program, where the program implements a method for rendering a particle effect according to the above embodiments when executed by a processor.

It should be noted that the computer-readable medium of the present disclosure may be a computer-readable signal medium, a computer-readable storage medium, or any combination of the computer-readable signal medium and the computer-readable storage medium. The computer-readable storage medium may be, for example, but not limited to, systems, apparatuses or devices of electricity, magnetism, light, electromagnetism, infrared or semiconductors, or any combination of the above. More specific examples of the computer-readable storage medium may include, but not limited to: an electrically connected and portable computer disk having one or more wires, a hard drive, a RAM, a ROM, an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium that includes or stores a program that may be used by an instruction execution system, apparatus, or device or in combination with the instruction execution system, apparatus, or device. In the present disclosure, the computer-readable signal medium may include a data signal propagating in a baseband or as part of a carrier wave, which carry computer-readable program codes. The data signal propagating may take various forms, including, but not limited to, an electromagnetic signal, an optical signal, or any suitable combination of the above. The computer-readable signal medium may further be any computer-readable medium apart from the computer-readable storage medium, and the computer-readable signal medium may send, propagate, or transmit programs used by the instruction execution system, apparatus, or device or in combination with the instruction execution system, apparatus, or device. Program codes included on the computer-readable medium may be transmitted by using any suitable medium, including, but not limited to, wire, optical cable, radio frequency (RF), etc., or any suitable combination of the above.

In some embodiments, a client and a server may communicate by utilizing any currently known or future developed network protocol such as a hyper text transfer protocol (HTTP), and may interconnect with digital data communication (for example, communication network) in any form or medium. An example of the communication network includes a local area network (LAN), a wide area network (WAN), an internet work (for example, the Internet), an end-to-end network (for example, ad hoc end-to-end network), as well as any currently known or future developed network.

The computer-readable medium described above may be included in the electronic device described above, or exist separately without being assembled into the electronic device.

The computer-readable medium described above carries one or more programs. When executed by the electronic device, the one or more programs cause the electronic device to: obtain a particle morphology model, where the particle morphology model includes vertex sub-models constituting an overall model; determine a running trajectory of a vertex sub-model based on a particle reorganization rule; and render the vertex sub-model during a running process in real time, by controlling the vertex sub-model to run based on a corresponding running trajectory.

Computer program codes configured to execute operations of the disclosure may be written in one or more programming languages or a combination of the programming languages. The programming languages described above include, but not limited to, object-oriented programming languages such as Java, Smalltalk, and C++, and further include conventional procedural programming languages such as "C" programming language or similar programming languages. The program codes may be executed entirely on a user computer, executed partially on the user computer, executed as a stand-alone software package, executed partially on the user computer and partially on a remote computer, or executed entirely on the remote computer or a server. Where the remote computer is involved, the remote computer may be connected to the user computer by means of any kind of network, including the LAN or the WAN, or may be connected to an external computer (for example, the remote computer is connected by means of the Internet by an Internet service provider).

Flow charts and block diagrams in the accompanying drawings illustrate system structures, functions and operations, which may be implemented according to systems, methods and computer program products in the various examples of the disclosure. In this regard, each block in the flow charts or the block diagrams may represent a module, a program segment, or a part of a code, which may include one or more executable instructions configured to implement logical functions specified. It should also be noted that in some alternative implementations, functions noted in the blocks may also occur in sequences different from those in the accompanying drawings. For example, the functions represented by two continuous blocks may be actually implemented basically in parallel, sometimes implemented in reverse sequences, which depends on the involved functions. It should also be noted that each block in the block diagrams and/or the flow charts, and combinations of the blocks in the flow charts and/or the block diagrams, may be implemented by using dedicated hardware-based systems that implement the specified functions or operations, or may be implemented by using combinations of dedicated hardware and computer instructions.

The units described in embodiments of the present disclosure can be implemented in a manner of software or hardware. The names of the units do not constitute limitations to the units themselves in some cases.

The functions described above herein may be at least partially executed by one or more hardware logic components. For example, non-restrictively, demonstration types of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may include or store a program for use by the instruction execution system, apparatus, or device or in combination with the instruction execution system, apparatus, or device. The machine-readable medium may be a computer-readable signal medium or a computer-readable storage medium. The machine-readable medium may include, but not limited to, an electronic, magnetic, optical, electromagnetic, infrared, or semiconductor system, apparatus, or device, or any suitable combination of the above. More specific examples of the machine-readable storage medium may include an electrically connected and portable computer disk having one or more wires, a portable computer diskette, a hard disk, a RAM, a ROM, an erasable programmable read-only memory (EPROM or flash memory), an optical fiber, a CD-ROM, an optical storage device, a magnetic storage device, or any suitable combination of the above.

According to one or more embodiments of the present disclosure, a method for rendering a particle effect is provided in [Example 1]. The method includes: obtaining a particle morphology model, wherein the particle morphology model comprises vertex sub-models constituting an overall model; determining a running trajectory of a vertex sub-model based on a particle reorganization rule; and rendering the vertex sub-model during a running process in real time, by controlling the vertex sub-model to run based on a corresponding running trajectory.

According to one or more embodiments of the present disclosure, a method for rendering a particle effect is provided in [Example 2]. Determining the running trajectory of the vertex sub-model based on the particle reorganization rule comprises: determining running positions of the vertex sub-model at a plurality of time points based on the particle reorganization rule; and forming the running trajectory based on the running positions at the plurality of time points.

According to one or more embodiments of the present disclosure, a method for rendering a particle effect is provided in [Example 3]. The particle reorganization rule comprises: a target position, a running direction, and a running duration of the vertex sub-model.

According to one or more embodiments of the present disclosure, a method for rendering a particle effect is provided in [Example 4]. The running direction of the vertex sub-model is a normal direction of the vertex sub-model, or, the running direction of the vertex sub-model is determined based on the normal direction of the vertex sub-model and a rotation matrix.

According to one or more embodiments of the present disclosure, a method for rendering a particle effect is provided in [Example 5]. The particle reorganization rule further comprises a random running parameter of the vertex sub-model.

According to one or more embodiments of the present disclosure, a method for rendering a particle effect is provided in [Example 6]. The rendering the vertex sub-model during the running process in real time comprises: determining a transparency of the vertex sub-model at each of a plurality of time points during a rendering process according to position information of the vertex sub-model; and rendering the vertex sub-model based on the transparency and a running position at each of the plurality of time points.

According to one or more embodiments of the present disclosure, a method for rendering a particle effect is provided in [Example 7]. An initial transparency of the vertex sub-model is sequentially increased in a rendering direction; and the transparency of the vertex sub-model is gradually reduced during the rendering process until the transparency of the vertex sub-model is a first transparency.

According to one or more embodiments of the present disclosure, a method for rendering a particle effect is provided in [Example 8]. The method further comprises: synchronously rendering the overall model in a process of rendering a plurality of vertex sub-models in real time, and setting the vertex sub-models to be in a fully transparent state at an end time of rendering, wherein a rendering duration for the particle morphology model is the same as a rendering duration for the overall model.

According to one or more embodiments of the present disclosure, a method for rendering a particle effect is provided in [Example 9]. The rendering the overall model comprises: sequentially adjusting, according to a rendering direction, transparencies of data points on a plurality of position lines of the overall model in the rendering direction, wherein an initial transparency of the overall model is a second transparency, and the plurality of position lines are perpendicular to the rendering direction.

According to one or more embodiments of the present disclosure, a method for rendering a particle effect is provided in [Example 10]. The adjusting the transparencies of the data points on the plurality of position lines of the overall model in the rendering direction comprises: adjusting a transparency of a data point on a triggered position line to a third transparency; or gradually reducing the transparency of the data point on the triggered position line until the transparency of the data point on the triggered position line is a third transparency.

According to one or more embodiments of the present disclosure, a method for rendering a particle effect is provided in [Example 11]. The obtaining the particle morphology model comprises: invoking a model; and dividing the model based on grids of the model to obtain the plurality of vertex sub-models, where the vertex sub-models form the particle morphology model.

According to one or more embodiments of the present disclosure, a method for rendering a particle effect is provided in [Example 12]. The obtaining the particle morphology model comprises: invoking the particle morphology model of a model in response to a selection operation on the model.

According to one or more embodiments of the present disclosure, a method for rendering a particle effect is provided in [Example 13]. The method further comprises: obtaining a rendering parameter of the model in response to a setting operation on the rendering parameter, wherein the rendering parameter comprises at least one of: a rendering duration or a rotation type.

According to one or more embodiments of the present disclosure, a method for rendering a particle effect is provided in [Example 14]. The method further comprises: invoking the particle reorganization rule corresponding to an effect type in response to a selection operation on the effect type, wherein the particle reorganization rule comprises at least one of: a diffusion sub-rule or a contraction sub-rule.

According to one or more embodiments of the present disclosure, an apparatus for rendering a particle effect is provided in [Example 15]. The apparatus includes: a model obtaining module, configured to obtain a particle morphology model, wherein the particle morphology model comprises vertex sub-models constituting an overall model; a running trajectory determination module, configured to determine a running trajectory of a vertex sub-model based on a particle reorganization rule; and a rendering module, configured to render the vertex sub-model during a running process in real time by controlling the vertex sub-model to run based on a corresponding running trajectory.

Furthermore, although various operations are described in a specific order, this should not be understood as requiring the operations to be executed in the specific order shown or in a sequential order. In a certain environment, multitasking and parallel processing may be advantageous. Similarly, although several specific implementation details are included in the above discussion, these details should not be interpreted as limiting the scope of the disclosure. Certain features described in the context of a single embodiment can further be implemented in a single embodiment in a combined manner. On the contrary, various features described in the context of a single embodiment can also be implemented in multiple embodiments separately or in an any suitable sub-combination manner.

I claim:

1. A method for rendering a particle effect, comprising:

obtaining an overall model and a particle morphology model corresponding to the overall model in response to a selection operation, wherein the particle morphology model comprises a plurality of vertex sub-models, and the particle morphology model is pre-created based on dividing the overall model into the plurality of vertex sub-models;

determining a running trajectory of each of the plurality of vertex sub-models based on a particle reorganization rule, wherein the running trajectory is configured to control a corresponding vertex sub-model to run to a position preset in the particle morphology model;

rendering the plurality of vertex sub-models in real time by controlling the plurality of vertex sub-models to run based on a corresponding running trajectory;

synchronously rendering the overall model while rendering the plurality of vertex sub-models of the particle morphology model;

increasing transparency of the plurality of vertex sub-models while decreasing transparency of the overall model during the rendering; and controlling the plurality of vertex sub-models to be in a fully transparent state at an end time point of the rendering.

2. The method of claim 1, wherein determining the running trajectory of each of the plurality of vertex sub-models based on the particle reorganization rule comprises:

determining running positions of the vertex sub-model at a plurality of time points based on the particle reorganization rule; and forming the running trajectory based on the running positions at the plurality of time points.

3. The method of claim 1, wherein the particle reorganization rule comprises: a target position, a running direction, and a running duration of the vertex sub-model.

4. The method of claim 3, wherein the running direction of the vertex sub-model is a normal direction of the vertex sub-model, or, the running direction of the vertex sub-model is determined based on the normal direction of the vertex sub-model and a rotation matrix.

5. The method of claim 3, wherein the particle reorganization rule further comprises a random running parameter of the vertex sub-model.

6. The method of claim 1, wherein rendering the plurality of vertex sub-models in real time comprises:

determining a transparency of each vertex sub-model at each of a plurality of time points during a rendering process according to position information of the vertex sub-model; and rendering the vertex sub-model based on the transparency and a running position at each of the plurality of time points.

7. The method of claim 6, wherein an initial transparency of the vertex sub-model is sequentially increased in a rendering direction; and the transparency of the vertex sub-model is gradually reduced during the rendering process until the transparency of the vertex sub-model is a first transparency.

8. The method of claim 6, wherein a rendering duration for the particle morphology model is the same as a rendering duration for the overall model.

9. The method of claim 8, wherein rendering the overall model comprises:

sequentially adjusting, according to a rendering direction, transparencies of data points on a plurality of position lines of the overall model in the rendering direction, wherein an initial transparency of the overall model is a second transparency, and the plurality of position lines are perpendicular to the rendering direction.

10. The method of claim 9, wherein sequentially adjusting the transparencies of the data points on the plurality of position lines of the overall model in the rendering direction comprises:

adjusting a transparency of a data point on a triggered position line to a third transparency; or gradually reducing the transparency of the data point on the triggered position line until the transparency of the data point on the triggered position line is a third transparency.

11. The method of claim 1, further comprising:

obtaining a rendering parameter in response to a setting operation on the rendering parameter, wherein the rendering parameter comprises at least one of a rendering duration or a rotation type.

12. The method of claim 1, further comprising:

invoking the particle reorganization rule corresponding to an effect type in response to a selection operation on the effect type, wherein the particle reorganization rule comprises at least one of a diffusion sub-rule or a contraction sub-rule.

13. An electronic device, comprising:

one or more processors; and a memory, configured to store one or more programs that, when executed by the one or more processors, cause the one or more processors to perform operations comprising:

obtaining an overall model and a particle morphology model corresponding to the overall model in response to a selection operation, wherein the particle morphology model comprises a plurality of vertex sub-models, and the particle morphology model is pre-created based on dividing the overall model into the plurality of vertex sub-models;

determining a running trajectory of each of the plurality of vertex sub-models based on a particle reorganization rule, wherein the running trajectory is configured to control a corresponding vertex sub-model to run to a position preset in the particle morphology model;

rendering the plurality of vertex sub-models in real time by controlling the plurality of vertex sub-models to run based on a corresponding running trajectory;

synchronously rendering the overall model while rendering the plurality of vertex sub-models of the particle morphology model;

increasing transparency of the plurality of vertex sub-models while decreasing transparency of the overall model during the rendering; and controlling the plurality of vertex sub-models to be in a fully transparent state at an end time point of the rendering.

14. The electronic device of claim 13, wherein the determining the running trajectory of each of the plurality of vertex sub-models based on the particle reorganization rule comprises:

determining running positions of the vertex sub-model at a plurality of time points based on the particle reorganization rule; and forming the running trajectory based on the running positions at the plurality of time points.

15. The electronic device of claim 13, wherein the rendering the plurality of vertex sub-models in real time comprises:

determining a transparency of each vertex sub-model at each of a plurality of time points during a rendering process according to position information of the vertex sub-model; and rendering the vertex sub-model based on the transparency and a running position at each of the plurality of time points.

16. The electronic device of claim 13, the operations further comprising:

obtaining a rendering parameter in response to a setting operation on the rendering parameter, wherein the rendering parameter comprises at least one of a rendering duration or a rotation type.

17. The electronic device of claim 13, the operations further comprising:

invoking the particle reorganization rule corresponding to an effect type in response to a selection operation on the effect type, wherein the particle reorganization rule comprises at least one of a diffusion sub-rule or a contraction sub-rule.

18. A non-transitory storage medium comprising a computer-executable instruction that, when executed by a computer processor, is configured to perform operations comprising:

obtaining an overall model and a particle morphology model corresponding to the overall model in response to a selection operation, wherein the particle morphology model comprises a plurality of vertex sub-models, and the particle morphology model is pre-created based on dividing the overall model into the plurality of vertex sub-models;

determining a running trajectory of each of the plurality of vertex sub-models based on a particle reorganization rule, wherein the running trajectory is configured to control a corresponding vertex sub-model to run to a position preset in the particle morphology model;

rendering the plurality of vertex sub-models in real time by controlling the plurality of vertex sub-models to run based on a corresponding running trajectory;

synchronously rendering the overall model while rendering the plurality of vertex sub-models of the particle morphology model;

increasing transparency of the plurality of vertex sub-models while decreasing transparency of the overall model during the rendering; and controlling the plurality of vertex sub-models to be in a fully transparent state at an end time point of the rendering.

19. The non-transitory storage medium of claim 18, wherein the determining a running trajectory of each of the plurality of vertex sub-models based on a particle reorganization rule comprises:

determining running positions of each vertex sub-model at a plurality of time points based on the particle reorganization rule; and forming the running trajectory based on the running positions at the plurality of time points.

20. The non-transitory storage medium of claim 18, wherein rendering the plurality of vertex sub-models in real time comprises:

determining a transparency of each vertex sub-model at each of a plurality of time points during a rendering process according to position information of the vertex sub-model; and rendering the vertex sub-model based on the transparency and a running position at each of the plurality of time points.

* * * * *